US005897602A

United States Patent [19]

Mizuta

[11] Patent Number: 5,897,602

[45] **Date of Patent: *Apr. 27, 1999**

[54] CAR NAVIGATION SYSTEM

[75] Inventor: Masaharu Mizuta, Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,946

[22] Filed: Aug. 26, 1996

[30] Foreign Application Priority Data

Mar. 6, 1996 [JP] Japan .................................... 8-049057

[51] Int. Cl.[6] ........................... G06F 17/40; G06F 165/00

[52] U.S. Cl. ........................... 701/201; 701/207; 701/35; 340/990; 340/995

[58] Field of Search .................................... 701/201, 202, 701/204, 206, 207, 208, 209, 210, 211, 213, 217, 35; 340/988, 990, 995, 438, 439

[56] References Cited

U.S. PATENT DOCUMENTS 4,258,421 3/1981 Juhasz et al. ............................ 701/35
4,644,368 2/1987 Mutz ...................................... 340/439
4,853,856 8/1989 Hanway .................................... 701/35
4,853,859 8/1989 Morita et al. ........................... 340/459
5,379,219 1/1995 Ishibashi ................................. 340/438
5,550,738 8/1996 Bailey et al. ............................. 701/35
5,581,464 12/1996 Woll et al. .............................. 340/438
5,587,911 12/1996 Asonao et al. .......................... 701/202
5,612,881 3/1997 Moroto et al. .......................... 701/209

FOREIGN PATENT DOCUMENTS 61-243482 10/1986 Japan .
63-150619 6/1988 Japan .
6-186044 7/1994 Japan .

*Primary Examiner*—Tan Q. Nguyen

[57] ABSTRACT

A car navigation system equipped with an interface for a detachable memory card that stores travel tracks and the like of cars and the like, comprises a data collector that collects, once at every given time interval or at every given distance interval, the travel date, starting position, destination, passing position, starting time, passing time, arrival time, travel distance and the like, a data recorder that stores the travel data collected by the data collector in the memory card, and a data printing processor that reads out data specified by the user from the travel records stored in the memory card to output the travel data to a printer.

7 Claims, 6 Drawing Sheets

| 31 Record class | 32 Travel data | 33 Recording time | 34 Starting / passing position | 35 Destination | 36 Travel distance | 37 Spent time | |
|---|---|---|---|---|---|---|---|
| H | 96.2.1 | 10 : 00 | A | F | 30 | 0 : 47 | (a) |
| D | 96.2.1 | 10 : 00 | A | — | 0 | — | |
| D | 96.2.1 | 10 : 10 | vicinity of B | — | 8 | — | |
| D | 96.2.1 | 10 : 20 | Crossing C | — | 10 | — | |
| D | 96.2.1 | 10 : 30 | D | — | 15 | — | |
| D | 96.2.1 | 10 : 40 | vicinity of E | — | 25 | — | |
| D | 96.2.1 | 10 : 47 | F | — | 30 | — | |
| H | 96.2.1 | 12 : 30 | P | T | 28 | 0 : 45 | (b) |
| D | 96.2.1 | 12 : 30 | P | — | 0 | — | |
| D | 96.2.1 | 12 : 43 | vicinity of R | — | 10 | — | |
| D | 96.2.1 | 12 : 55 | Crossing S | — | 20 | — | |
| D | 96.2.1 | 13 : 15 | T | — | 28 | — | |

*Fig.3*

| 31 Record class | 32 Travel data | 33 Recording time | 34 Starting / passing position | 35 Destination | 36 Travel distance | 37 Spent time | |
|---|---|---|---|---|---|---|---|
| H | 96.2.1 | 10 : 00 | A | F | 30 | 0 : 47 | (a) |
| D | 96.2.1 | 10 : 00 | A | — | 0 | — | (a) |
| D | 96.2.1 | 10 : 10 | vicinity of B | — | 8 | — | (a) |
| D | 96.2.1 | 10 : 20 | Crossing C | — | 10 | — | (a) |
| D | 96.2.1 | 10 : 30 | D | — | 15 | — | (a) |
| D | 96.2.1 | 10 : 40 | vicinity of E | — | 25 | — | (a) |
| D | 96.2.1 | 10 : 47 | F | — | 30 | — | (a) |
| H | 96.2.1 | 12 : 30 | P | T | 28 | 0 : 45 | (b) |
| D | 96.2.1 | 12 : 30 | P | — | 0 | — | (b) |
| D | 96.2.1 | 12 : 43 | vicinity of R | — | 10 | — | (b) |
| D | 96.2.1 | 12 : 55 | Crossing S | — | 20 | — | (b) |
| D | 96.2.1 | 13 : 15 | T | — | 28 | — | (b) |

CAR NAVIGATION SYSTEM

BACKGROUND OF THE INVENTION

1. Field of the Invention

The present invention relates to a navigation system installed in a vehicle such as a car, and more particularly to a navigation system that has a function of printing travel records.

2. Description of the Related Art

FIG. 6 shows a block diagram of a prior car navigation system. In FIG. 6, the car navigation system comprises a central processing unit 11, abbreviated to CPU hereafter, that processes data, memory 12 that stores processing programs, data, and the like, an input device 13 that takes data from the user, a position measuring unit 14 that measures the current position, a display unit 15 that displays maps, travel records, and the like, a display controller 16 that controls display unit 15, a CD-ROM player 17 that drives a CD-ROM (compact disk ROM) that is a storage medium for map information and the like, a CD-ROM controller 18 that controls CD-ROM player 17, and a memory card controller 20 that has an interface function for connecting a memory card 19 that stores travel-record data and the like. Memory 12 is composed of ROM and RAM and stores processing programs, travel-record data, map screen information, and the like. CPU 11 performs processing for screen control, position calculation, route calculation, route guiding, and the like. Position measuring unit 14 is composed of a GPS (global positioning system) and others and measures the longitude and latitude information about the current position to send it to CPU 11. Memory card 19 is a detachable storage medium and records and preserves travel routes, travel tracks, and the like. The information about the recorded data is retrieved by the user's input through input device 13 and displayed on display unit 15.

In the prior car navigation system, position measuring unit 14 measures the current position, and CPU 11 accesses CD-ROM player 17 based on the position information to display map screen information including the current position on display unit 15. Further, CPU 11 executes the procedures of the programs stored in memory 12 following the input through input device 13 to perform route searching, route guiding including aural guiding, displaying of a route chart, and the like. CPU 11 also preserves travel track records in the connected memory card 19, and can read out a past travel record therefrom to display on display unit 15 for confirmation.

The prior car navigation system can display on the screen of display unit 15 the current route and past travel records recorded on memory card 19, and also can make a copy for each screen. However, it does not have a function of printing past travel records recorded on the memory card. Therefore, it cannot print out travel records that are necessary for operating control of vehicles for business use, such as travel positions, travel distance, travel time, and the like.

SUMMARY OF THE INVENTION

The object of the present invention is therefore to provide a car navigation system that can record travel tracks as data and can print out the recorded data.

In order to achieve the aforementioned objective, in a car navigation system having an interface for an external detachable storage medium that stores travel data of vehicles such as tracks of traveling cars, a car navigation system in accordance with the present invention comprises a data collecting means that collects, once at every predetermined time interval or at every predetermined distance interval, travel data such as travel dates, starting positions, destinations, passing positions, departure time, passing time, arrival time, travel distance, and the like, a data recording means that records on the external storage medium the travel data collected by the data collecting means, and a printing means that extracts pieces of data specified by the user from the travel data recorded on the external storage medium and prints out in a predetermined format the specified travel data such as travel dates, starting positions, destinations, passing positions, departure time, passing time, arrival time, travel distance, and the like.

The data collecting means collects, once at every predetermined time interval or at every predetermined distance interval, travel data such as travel dates, starting positions, destinations, passing positions, departure time, passing time, arrival time, travel distance, and the like. The data recording means records on the external storage medium the travel data collected by the data collecting means in a predetermined format. The printing means reads out the travel data recorded on the external storage medium, and edits and prints out in a predetermined format.

Preferably, in the car navigation system, the printing means edits in a predetermined format the travel data recorded on the external storage medium in the order of passing positions to print out travel dates, passing positions, passing time, travel distance, and the like.

The printing means reads out the travel data recorded on the external storage medium to edit and print out the read-out data in a predetermined format in the order of passing positions.

Preferably, in the car navigation system, the printing means is equipped with an interface means that converts the output signal into a Fax signal.

The printing means converts the output signal for ordinary printers into a Fax signal by the interface means to output. The car navigation system can print the travel data by a FAX machine by this means.

Preferably, in the car navigation system, the external storage medium provides recorded travel data to information processing apparatus having an interface for the external storage medium.

The external storage medium provides recorded travel data to an information processing apparatus having an interface for the external storage medium. The information processing apparatus reads out data from the external storage medium to perform data processing such as printing.

BRIEF DESCRIPTION OF THE DRAWINGS

These and other objects and features of the present invention will become clear from the following description taken in conjunction with the preferred embodiment thereof and the accompanying drawings throughout which like parts are designated by like reference numerals, and in which:

FIG. 3 shows a recording format for travel data stored in a memory card;

DETAILED DESCRIPTION OF THE PREFERRED EMBODIMENTS

The preferred embodiment according to the present invention will be described below in conjunction with the attached drawings.

Figure 1:
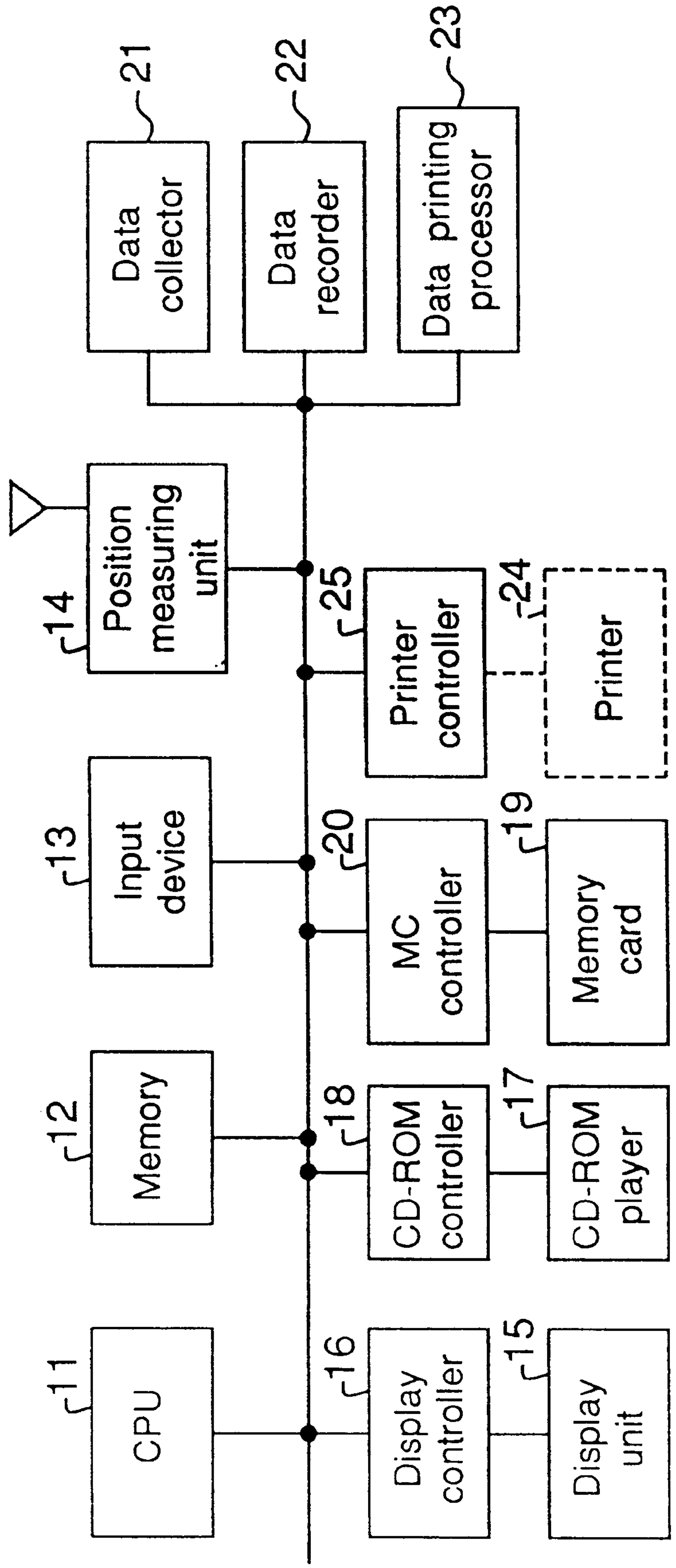
FIG. 1 is a block diagram illustrating the car navigation system of the embodiment in accordance with the present invention.
Figure 6:
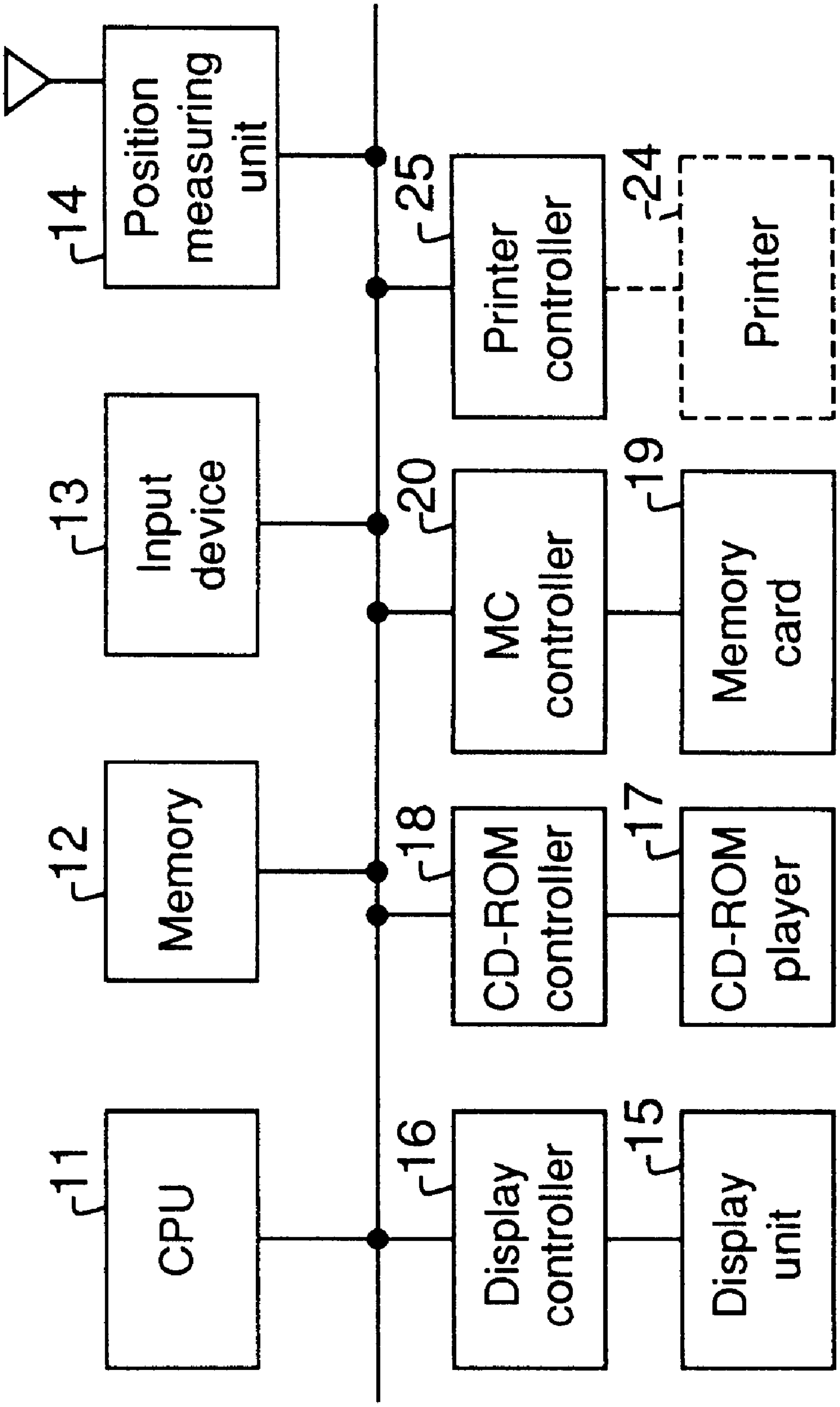
Fig.6 PRIOR ART
FIG. 6 is a block diagram illustrating a conventional car navigation system.

FIG. 1 is a block diagram illustrating the hardware construction of the car navigation system in the present embodiment. The car navigation system of FIG. 1 is constructed by adding to the prior car navigation system of FIG. 6 a data collector 21 that collects travel data based on given conditions, a data recorder 22 that records the collected data in a memory card 19, a data printing processor 23 that reads out the recorded data to process for printing, and a printer controller 25 that performs control of a connected printer 24. Data collector 21, data recorder 22, and a data printing processor 23 are controlled by CPU 11 that follows programs stored in memory 12. Following the instructions of CPU 11, printer controller 25 performs control for outputting information such as screen information, travel records, and the like to printer 24 to output printing information through the printer 24 connected to printer controller 25.

Figure 2:
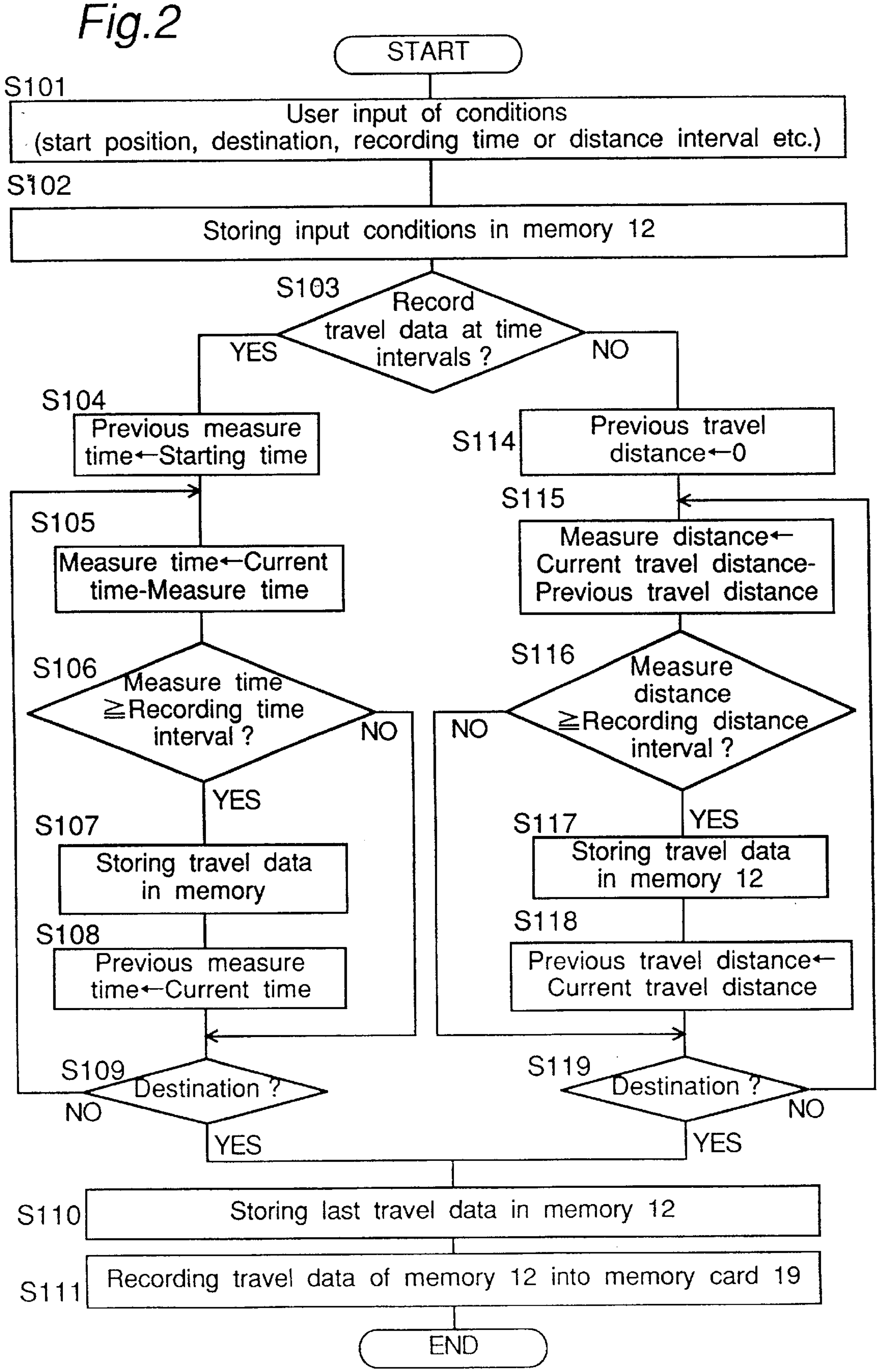
FIG. 2 is a flow chart showing the procedure for recording travel data in the car navigation system of the embodiment in accordance with the present invention.

The operation of the car navigation system in the present embodiment is described as follows. The car navigation system of the present embodiment collects and records track data during travel, based on given conditions, and has a function of printing out recorded track records after the travel. First, the procedure of recording travel tracks is described in conjunction with the flow chart of FIG. 2.

When the car navigation system of the present embodiment starts to record a travel track, the user first inputs information about the starting position, the destination, and recording conditions through input device 13 (S101). As the recording conditions, the user inputs whether data collection during travel is performed once at every given time interval or at every given distance interval and also inputs the value of the time interval or the distance interval. After the completion of the input by the user, data collector 21 stores in memory 12 information about the starting position, the destination, the recording conditions (the recording time interval or recording distance interval etc.), and the starting time (S102). Next, data collector 21 judges whether travel data is recorded at every time interval or at every distance interval (S103).

If the recording is performed once at every time interval, data collector 21 sets the previous measure time at the starting time for initialization (S104), and calculates the measure lapse by subtracting the previous measure time from the current time (S105). Data collector 21 then compares the measure lapse with the recording time interval (S106), proceeds with step S109 if the measure lapse is less than the recording time interval. If the measure lapse is greater than or equal to the recording time interval, then, data collector 21 records in memory 12 the position name (passing position) at that time, the current time (passing time), the travel distance from the starting position, and the like (S107). Here, the position name is obtained by taking position information from the CD-ROM in CD-ROM player 17 based on position information handed over from position measuring unit 14. If the passing position is an informative facility, location, or an intersection, then information about its name is made the position name; if it is not, then information such as "near ~" is recorded for the position name, as is practiced in the guidance of prior car navigation systems. Data collector 21 sets the previous measure time at the current time after data recording (S108), and proceeds with the next step (S109). In step S109, data collector 21 judges whether the current travel position is the destination or not. If it is not, then data collector returns to step 105 to repeat the above loop until the current travel position becomes the destination. If the current travel position is the destination, then data collector 21 records in memory 12 the position name at the current time, the current time, and the travel distance from the starting position (S110). Data recorder 22 records, in memory card 19, the travel record recorded in memory 12 by data collector, following the above procedure in a format shown in FIG. 3 and described later, to end the processing (S111).

If the recording is performed once at every distance interval, then data collector 21 sets the previous travel distance at zero for initialization (S114), and calculates measure distance by subtracting the previous travel distance from the current travel distance at the current time (S115). Data collector 21 then compares the measure distance with the recording distance interval (S116), proceeds with step S119 if the measure distance is less than the recording distance interval. If the measure distance is greater than or equal to the recording distance interval, then data collector 21 records in memory 12 the position name at that time, the current time (passing time), the travel distance from the starting position and the like (S117). Data collector 21 sets the previous measure distance at the current travel distance (S118) after data recording, and proceeds with the next step (S119). In step S119, data collector 21 judges whether the current travel position is the destination or not. If it is not, then data collector returns to step S115 to repeat the above loop until the current travel position becomes the destination. If the current travel position is the destination, then data collector 21 records in memory 12 the position name at the current time, the current time, and the travel distance from the starting position (S110). Data recorder 22 records, in memory card 19, the travel record recorded in memory 12 by data collector, following the above procedure in a format shown in FIG. 3 and described later to end the processing (S111).

As described above, data collector 21 collects travel data once at every time interval or at every distance interval, with the value of the interval being given by the user, and data recorder 22 records the collected travel data in memory card 19. Here the travel data is recorded in memory card 19, for example, in the format shown in FIG. 3. The data can be retrieved with the travel date 32, record time 33, and starting/passing position 34 as a key. The file format of FIG. 3 is described in detail in the following.

In FIG. 3, the part (a) of the rows is travel data recorded once at every time interval of 10 minutes when the vehicle traveled from a starting position A to a destination F. The part (b) of the rows is travel data recorded once at every distance interval of 10 km when the vehicle traveled from a starting position P to a destination T. In FIG. 3, the record class 31 is for distinguishing one kind of records from another. Here, H expresses head data, and D expresses detail data. Head data is the data that expresses the total travel distance from the starting position to the destination and the total time spent. Detail data expresses individual pieces of travel data for each recording time interval or each recording distance interval. In the case of head data, the date of traveling is recorded in the travel date 32, the starting time is recorded in the record time 33, the starting position is recorded in the starting/passing position 34, the destination is recorded in the destination 35, the distance from the starting position to the destination is recorded in the travel distance 36, and the time spent for traveling from the starting position to the destination is recorded in the spent time 37. In the case of detail data, the date of traveling is recorded in the travel date 32, the time the data is recorded is recorded in the record time 33, the passing position is recorded in the starting/passing position 34, and the distance from the starting position to the passing position is recorded in the travel distance 36; no data is recorded in the destination 35 and the spent time 37 in this case. In the present embodiment, detail data is successively recorded in the order of data collection, following the corresponding head data. Therefore, By retrieving head data with the travel date 32, record time 33, and starting/passing position 34 as a key and by successively reading out the following detail data until reading the next head data, the data of a selected travel record can be read out.

Next, the operation of printing out travel data recorded in memory card 19 is described as follows. When the user inputs a travel date, a starting time, and a starting position concerning the information he or she wants to retrieve, data printing processor 23 searches for the data corresponding to the input, to read out the data successively from memory card 19, and outputs time, position names, travel distance, and the like to printer 24 in a format shown in FIG. 4. The procedure in this case is described in the following in conjunction with the flow chart of FIG. 5.

Figure 4:
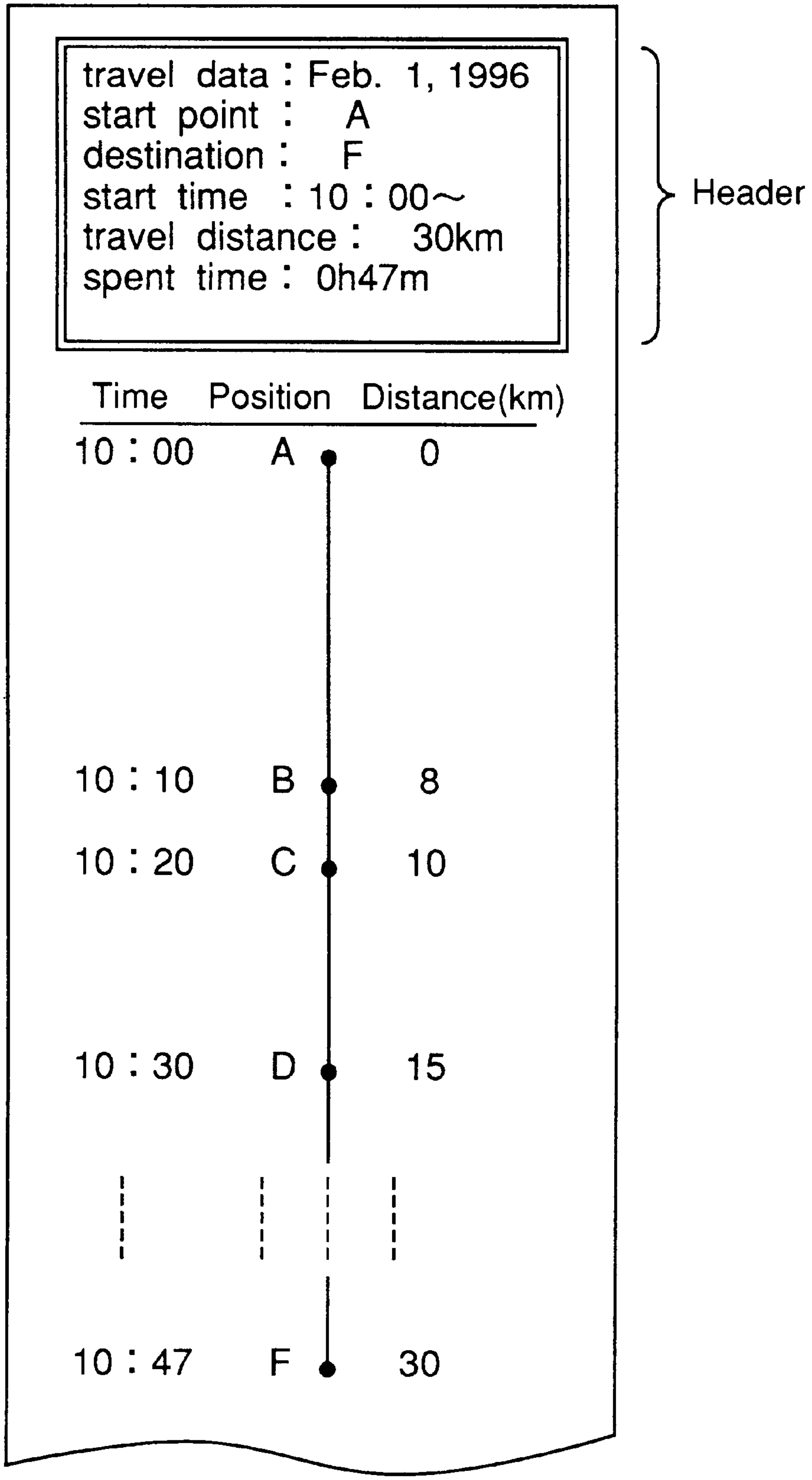
FIG. 4 shows printed results of travel data.
Figure 5:
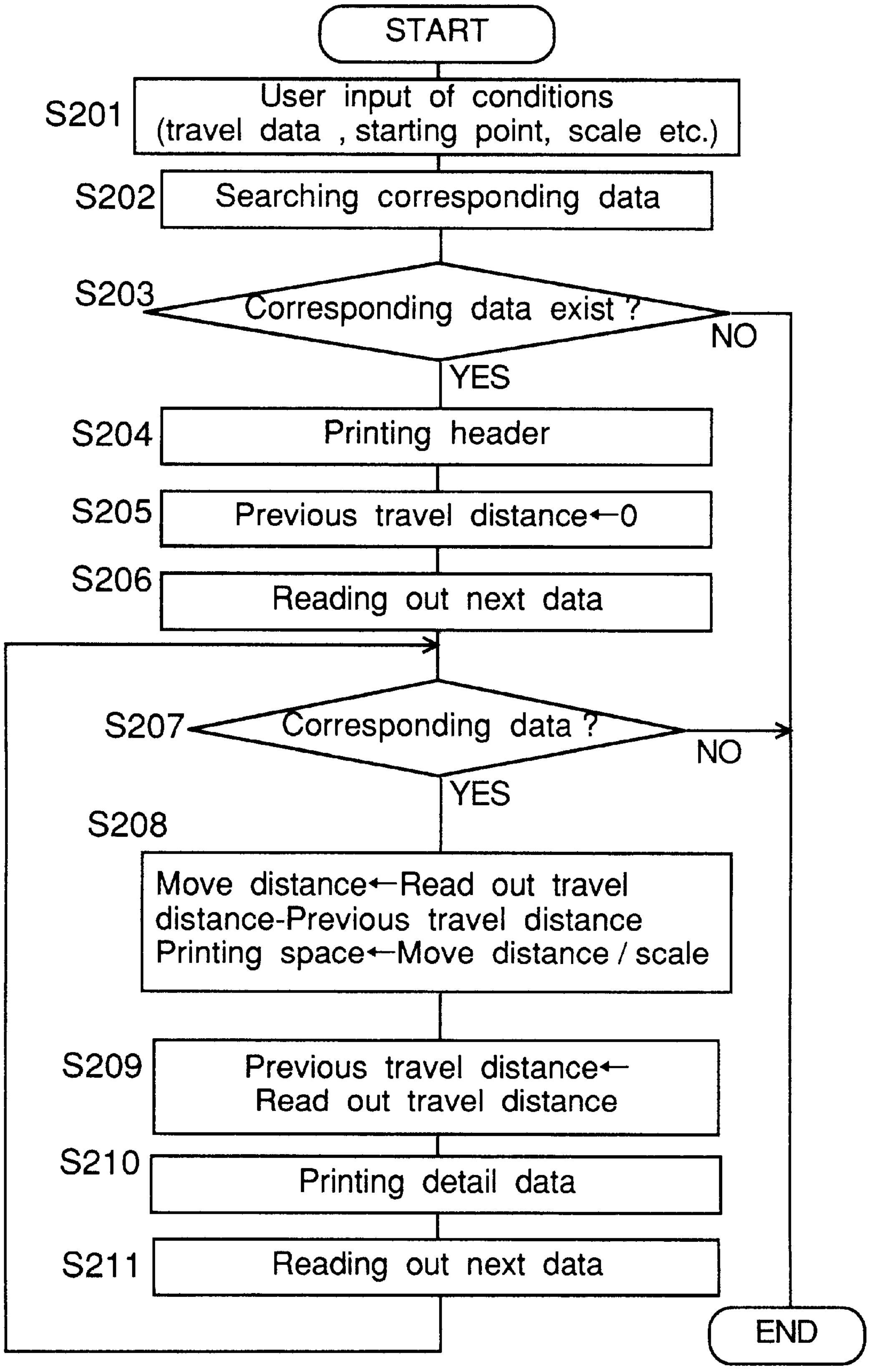
FIG. 5 is a flow chart showing the procedure for printing travel data in the car navigation system of the embodiment in accordance with the present invention.

In the car navigation system of the present embodiment, when a travel track recorded in memory card 19 is printed out, the user first inputs data for specifying the travel record to be printed out, that is, the travel date, starting time, starting position, etc., and a scale (S201). Here, the scale is the relationship between the distance in the real world and the distance in the printed drawing. For example, the scale determines by how many centimeters a distance of 1 km is spaced in the drawing. Data printing processor 23 searches for head data corresponding to the key, which is the input data (S202) to judge the search results (S203). If data printing processor 23 could not find the corresponding head data, then it terminates the procedure. If data printing processor 23 has found the corresponding head data, then it prints the headlines as shown in FIG. 4 (S204). Next, data printing processor sets the previous travel distance at zero (S205), and reads out the next data (S206) to judge whether the read-out data is the corresponding travel-record data (S207). This judgement is made, as described above, by finding whether the data class of the read-out data is detail data D or head data H, since detail data is recorded immediately after the corresponding pieces of head data. If the data class of the read-out data is D, then it is judged to be the corresponding data; if the data class is H, then it is judged not to be the corresponding data. If the read-out data is not the corresponding data, then the procedure is terminated. If the read-out data is the corresponding data, data printing processor 23 calculates a printing space proportionate to actual displacement distance (S208). The printing space is calculated by the following procedure. The displacement distance of the previous travel interval is calculated by subtracting the previous travel distance from read-out travel distance. Then the printing space is calculated by dividing the obtained displacement distance by the scale. The successive passing positions are printed apart from each other by the printing space, which is proportionate to the displacement distance in the real world. Next, data printing processor 23 sets the previous travel distance at the read-out travel distance (S209) for the calculation of the next displacement distance. After the calculation of the printing space, data printing processor 23 instructs the printer 24 to perform a line feed by the printing space and print out the read-out data as shown in FIG. 4 (S210). Data printing processor 23 reads out the next data after the printing (S211), and proceeds to the step S207. After that, the above loop is repeated for the printing of the specified travel record until the data of the specified travel record is over.

In this way, data printing processor 23 can print out the past travel records stored in memory card 19. By this means past travel tracks are recorded, and the recorded data is printed out, so that operating control that has been impossible by a prior car navigation system can be made possible.

Further, the printer control 25 of the car navigation system of the present embodiment can be equipped with an interface having the similar function with a prior Fax MODEM, so that a Fax machine can be connected thereto, and travel records can be output from the Fax machine.

Further, the memory card 19 where travel data is recorded by the car navigation system of the present embodiment can be connected to an information processing apparatus that has an interface for the memory card, so that the information processing apparatus can perform general-purpose data processing such as reading data, printing travel records, and other data processing.

EFFECTS OF THE INVENTION

According to the car navigation system of the present invention, the data collecting means collects data once at every interval during travel, and the data recording means records the collected travel data in an external storage medium. Data about travel tracks can be recorded in the external storage medium in this way. Further, the printing means can edit the travel data recorded in the external storage medium in a predetermined format to print out, so that travel records that can be used for operating control can be provided.

According to the car navigation system of the preferred embodiment in accordance with the present invention, the printing means successively edits and prints out the recorded travel data in a predetermined format, so that travel records that can be used for operating control of vehicles for business use can be provided.

According to the car navigation system of the preferred embodiment in accordance with the present invention, the printing means is equipped with an interface for converting printing signals into Fax signals, so that Fax machines can be used for printing means.

According to the car navigation system of the preferred embodiment in accordance with the present invention, recorded data about travel tracks can be provided to an information processing apparatus through the external storage medium, so that the information processing apparatus can perform general-purpose data processing such as printing.

Although the present invention has been fully described in connection with the preferred embodiment thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A vehicle navigation system having an interface for a detachable external storage medium that stores travel data including travel tracks of the vehicle, said vehicle navigation system comprising:

an input means for inputting at least one of a predetermined distance interval and a predetermined time interval at which travel data is to be collected;

a data collecting means for collecting the travel data at every predetermined time interval or at every predetermined distance interval, the travel data including travel dates, starting positions, destinations, passing positions, departure time, passing time, arrival time, and travel distance;

a data recording means for recording the travel data collected by said data collecting means on said external storage medium; and a printing means for extracting pieces of travel data specified by a user from the travel data recorded on said external storage medium and for printing out the specified travel data in a predetermined format so as to provide a travel track of a completed trip of the vehicle at a plurality of intervals corresponding to at least one of the predetermined time interval and the predetermined distance interval.

2. The vehicle navigation system defined in claim 1, wherein said printing means edits the travel data recorded on said external storage medium in order of passing positions to print out travel dates, passing positions, passing time, and travel distance in the predetermined format.

3. The vehicle navigation system defined in claim 1, wherein said printing means is equipped with an interface means that converts an output signal into a Fax signal.

4. The vehicle navigation system defined in claim 1, wherein said external storage medium provides recorded travel data to an information processing apparatus having an interface for said external storage medium.

5. The vehicle navigation system defined in claim 1, wherein the travel track includes travel dates, starting positions, destinations, passing positions, departure time, passing time, arrival time, and travel distance corresponding to the completed trip.

6. A vehicle navigation system comprising:

input means for inputting a trip starting position, a trip destination position, and trip recording conditions;

data collecting means for collecting travel data based on the trip recording conditions;

data recording means for recording the collected travel data on an external storage medium in a recording format;

data printing processing means for extracting trip data from the recorded collected travel data stored on the external storage medium based on the recording format; and printing means for printing the extracted trip data in a printing format so as to provide a travel track of a completed trip of the vehicle at a plurality of intervals corresponding to the inputted trip recording conditions.

7. The vehicle navigation system of claim 6, wherein the plurality of intervals corresponds to at least one of an inputted recording condition time interval and an inputted recording condition distance interval, and said data collecting means collects data if a measured time is greater than or equal to the inputted recording condition time interval or if a measured distance is greater than or equal to the inputted recording condition distance interval.

* * * * *